US012679650B2

(12) United States Patent
    Kitamura

(10) Patent No.: US 12,679,650 B2
(45) Date of Patent: Jul. 14, 2026

(54) STORAGE SYSTEM

(71) Applicant: MURATA MACHINERY, LTD.,
     Kyoto (JP)

(72) Inventor: Wataru Kitamura, Inuyama (JP)

(73) Assignee: MURATA MACHINERY, LTD.,
     Kyoto (JP)

( * ) Notice: Subject to any disclaimer, the term of this
     patent is extended or adjusted under 35
     U.S.C. 154(b) by 357 days.

(21) Appl. No.: 18/687,862

(22) PCT Filed: Aug. 10, 2022

(86) PCT No.: PCT/JP2022/030530
     § 371 (c)(1),
     (2) Date: Feb. 29, 2024

(87) PCT Pub. No.: WO2023/032622
     PCT Pub. Date: Mar. 9, 2023

(65) Prior Publication Data
     US 2025/0136377 A1      May 1, 2025

(30) Foreign Application Priority Data
     Sep. 1, 2021 (JP) ................................. 2021-142787

(51) Int. Cl.
     *B65G 1/04*            (2006.01)
     *B65G 1/00*            (2006.01)
     (Continued)

(52) U.S. Cl.
     CPC .............. *B65G 1/137* (2013.01); *B65G 1/00*
     (2013.01); *B65G 1/04* (2013.01); *B65G
     1/0492* (2013.01); *B65G 1/06* (2013.01);
     *G06Q 10/087* (2013.01)

(58) Field of Classification Search
     CPC . B65G 1/137; B65G 1/00; B65G 1/04; B65G
     1/0492; B65G 1/06; G06Q 10/087
     See application file for complete search history.

(56) References Cited

U.S. PATENT DOCUMENTS 8,162,585 B2 * 4/2012 Tsujimoto ............ B65G 1/0407
                                                    414/940
2011/0184634 A1 7/2011 Harasaki
                  (Continued)

FOREIGN PATENT DOCUMENTS

CN        103662728 A      3/2014
CN        109533844 A      3/2019
                  (Continued)

OTHER PUBLICATIONS

Official Communication issued in International Patent Application
No. PCT/JP2022/030530, mailed on Oct. 11, 2022.
                  (Continued)

*Primary Examiner* — Thomas Randazzo
(74) *Attorney, Agent, or Firm* — Keating & Bennett, LLP

(57) ABSTRACT

A storage system includes an entrance port, a storage rack,
an exit port, transporters, and a determining controller. The
entrance port is a place at which an item is carried in from
the outside. The storage rack is structured to store the item.
The exit port is a place at which the item is carried out to the
outside. The transporter, by moving along a track, accesses
the entrance port, the storage rack, or the exit port. The
determining controller is configured or programmed to
determine that the storage system is available, when first and
second conditions are satisfied, the first condition being that
a path extending from the entrance port to the exit port
includes an available track, the second condition being that
there is any transporter capable of transporting the item
along the track that satisfies the first condition.

7 Claims, 7 Drawing Sheets

(51) Int. Cl.
   *B65G 1/06*        (2006.01)
   *B65G 1/137*       (2006.01)
   *G06Q 10/087*      (2023.01)

(56)                    References Cited

U.S. PATENT DOCUMENTS

2017/0129704 A1 *   5/2017   Okazaki ................... B65G 1/06
2020/0013104 A1 *   1/2020   Yamauchi ............ G06Q 10/087
2020/0227295 A1     7/2020   Murata et al.

FOREIGN PATENT DOCUMENTS

JP          09-255114  A       9/1997
JP          11-085280  A       3/1999
JP        2005053661  A   *   3/2005   ............... B65G 1/04
JP        2017036128  A   *   2/2017   ........... B65G 1/0492
TW         200738540  A      10/2007

OTHER PUBLICATIONS

Official Communication issued in corresponding Taiwanese Patent Application No. 111132427, mailed on May 8, 2025, 8 pages.

* cited by examiner

| | Track That Satisfies First Condition |
| | Unavailable Portion |

| | |
|---|---|
| Track That Satisfies First Condition |
| Unavailable Portion |

STORAGE SYSTEM

BACKGROUND OF THE INVENTION

1. Field of the Invention

The present invention relates to a storage system that stores an item carried in from outside, and that carries out an item to the outside.

2. Description of the Related Art

Japanese Patent No. 6562078 discloses a purge stocker including a storage rack and a stacker crane. The storage rack stores a container having been purged by a purge device. The stacker crane receives a container from a ceiling transport vehicle, transports the container, and stores the container in the storage rack. The stacker crane also takes out a container stored in the storage rack, and delivers the container to the ceiling transport vehicle.

Japanese Patent No. 5035424 discloses a traveling vehicle system that makes a traveling vehicle travel along a travel path. Disposed on the travel path are plural stations where delivery of goods take place. In the traveling vehicle system, a non-travelable section is set, where the traveling vehicle is not allowed to travel. In the traveling vehicle system, if it is possible to start from a station and return to the same station without going through the non-travelable section, this station is set as available.

SUMMARY OF THE INVENTION

The purge stocker of Japanese Patent No. 6562078 includes only one stacker crane, and therefore, if, for example, the stacker crane becomes unavailable, the purge stocker is unavailable, too. The traveling vehicle system of Japanese Patent No. 5035424 determines whether or not a station is available, but does not determine whether or not there is any traveling vehicle that has access to the station determined as available. Thus, there has been room for improvement in accuracy of determining the availability.

Example embodiments of the present invention provide storage systems each including plural transporters and each being capable of accurately determining whether or not the storage system is available even when some of the transporters are unusable.

The foregoing has described problems to be solved by various example embodiments of the present invention. The following will describe solutions to the problems and advantageous effects thereof.

An aspect of an example embodiment of the present invention provides a storage system configured as follows. The storage system stores an item carried in from outside, and carries out the stored item to the outside. The storage system includes an entrance port, a storage rack, an exit port, plural transporters, and a determining controller. The entrance port is a place at which the item is carried in from the outside. The storage rack stores the item. The exit port is a place at which the item is carried out to the outside. The transporters are movable along a track to access the entrance port, the storage rack, or the exit port. The determining controller is configured or programmed to determine that the storage system is available, when first and second conditions are satisfied, the first condition being that a path extending from the entrance port to the exit port includes an available track, the second condition being that there is the transporter capable of transporting the item along the track that satisfies the first condition.

Accordingly, even when a portion of the storage system is unavailable, it is possible to determine that the storage system is available, if another portion of the storage system is available. The storage system can be operated efficiently, therefore. Especially because the determination is made for the transporters as well as for the track, whether or not the storage system is available can be determined with a good accuracy.

In the storage system, it is preferable that the determining controller is configured or programmed to determine that the item carried in from the outside is storable, when a third condition in addition to the first and second conditions is satisfied, the third condition being that the storage rack adjacent to the track that satisfies the first condition is capable of storing the item.

Accordingly, it is possible to determine not only whether or not the storage system is available but also whether or not the item can be actually stored in the storage system.

The storage system is preferably configured as follows. The entrance port includes plural entrance ports, and the exit port includes plural exit ports. The determining controller is configured or programmed to determine whether or not the first condition is satisfied, for all combinations of the entrance ports and the exit ports.

Accordingly, an occurrence of a situation where the storage system is determined as unavailable though it actually is available can more securely be prevented.

The storage system is preferably configured as follows. The determining controller is configured or programmed to communicate with a management controller provides an instruction for the item to be carried into the entrance port. The determining controller is configured or programmed to transmit to the management controller whether or not the storage system is available.

Since the management controller can receive information indicating that the storage system is available, it is possible to make effective use of the storage system.

The storage system is preferably configured as follows. The entrance port includes plural entrance ports, and the exit port includes plural exit ports. The determining controller is configured or programmed to transmit to the management controller identification information to identify the entrance port and the exit port that satisfy the first and second conditions.

Since the management controller can be notified of the entrance port and the exit port that are available, it is possible to make further effective use of a management system.

The storage system is preferably configured as follows. The track includes plural loop tracks and a connecting track that connects the plural loop tracks. The entrance port and the exit port are adjacent to the loop track. The storage rack is in a region surrounded by the loop track and in a region interposed between the loop tracks.

Accordingly, whether or not the storage system is available can be determined even though the track is complicated by including the plural loop tracks.

The storage system is preferably configured as follows. The storage rack is capable of storing a plurality of the items in such a manner that the items are arranged one above another in a vertical direction. The transporters are capable of traveling along the track on a ceiling and movable up and down to access the items in the storage rack.

The effects of example embodiments of the present invention can be exerted more effectively when applied to storage systems each including a storage rack capable of storing a number of items.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
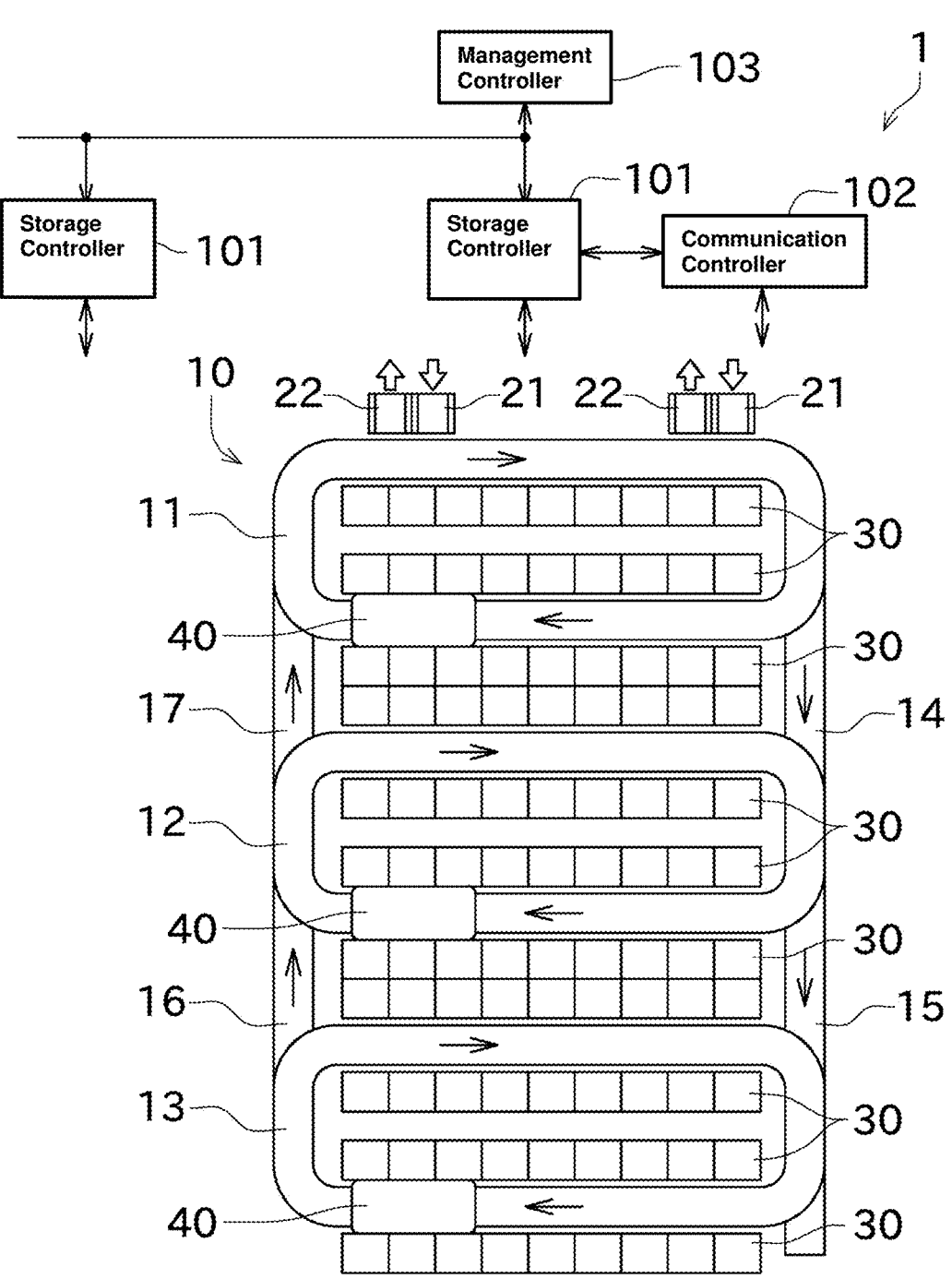
FIG. 1 is a diagram schematically showing a configuration of a storage system according to an example embodiment of the present invention.

The following will describe, with reference to the drawings, example embodiments of the present invention. Referring to FIG. 1, a configuration of a storage system 1 will be described. FIG. 1 is a diagram schematically showing a configuration of the storage system 1.

Figure 2:
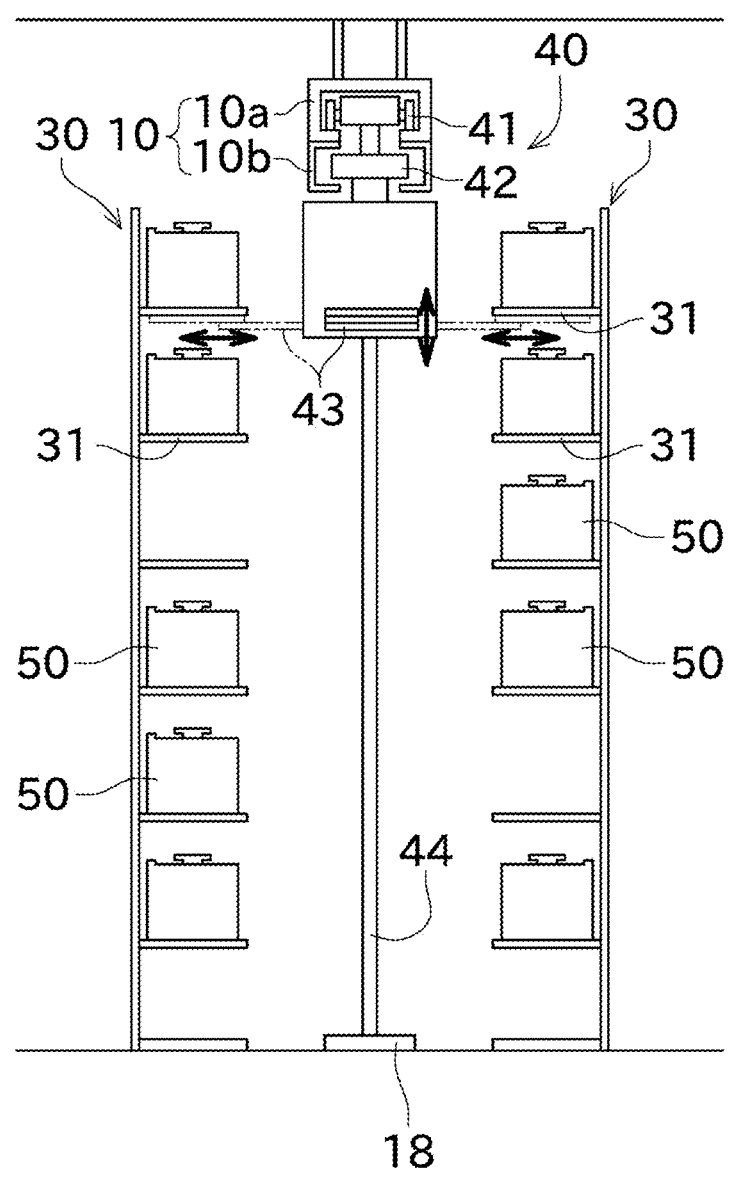
FIG. 2 is a side view schematically showing a configuration of a crane.

The storage system 1 of the present example embodiment, which may be installed in plural numbers at a factory for manufacturing semiconductor products, is a system for storing items 50 shown in FIG. 2. The item 50 stored in the storage system 1 is a FOUP (Front-Opening Unified Pod) that receives wafers (semiconductor wafers). In the factory, a processing apparatus to process a wafer is disposed, and the storage system 1 is used to, for example, temporarily store a wafer before the wafer is supplied to the processing apparatus. The item 50 may be a reticle pod that receives reticles.

As shown in FIG. 1, the storage system 1 includes a track 10, entrance ports 21, exit ports 22, storage racks 30, and cranes (transporters) 40.

The track 10 is disposed on a ceiling of the factory. The track 10 enables the cranes 40 to travel. As shown in FIG. 2, the track 10 includes a travel rail 10a and an electricity supply rail 10b. The travel rail 10a supports the cranes 40, and includes a traveling support surface to allow the cranes 40 to travel. The electricity supply rail 10b is disposed below the travel rail 10a. In the electricity supply rail 10b, an electricity supply line (not shown) is provided, to supply electric power to the cranes 40. A signal line (not shown) is disposed near the electricity supply rail 10b, to enable the cranes 40 to communicate with a management controller 103 which will be described later.

The track 10 includes loop tracks 11, 12, 13, and connecting tracks 14, 15, 16, 17. The loop tracks 11, 12, 13 are loop-shaped tracks. The loop tracks 11, 12, 13 are one-way, and allow the cranes 40 to travel only in the arrowed direction (clockwise) in the drawing. The loop tracks 11, 12, 13 are disposed side by side, and are connected by the connecting tracks 14, 15, 16, 17. To be specific, the loop track 11 and the loop track 12 are connected by the connecting tracks 14, 17, and the loop track 12 and the loop track 13 are connected by the connecting tracks 15, 16. The connecting tracks 14, 15, 16, 17 are one-way, and allow the cranes 40 to travel only in the arrowed direction in the drawing.

The entrance ports 21 and the exit ports 22 are connected to the outside of the storage system 1. Disposed outside the storage system 1 are the above-mentioned processing apparatus, a connecting path that connects the processing apparatus to the storage system 1, and a carriage that travels along the connecting path. At the entrance port 21, the crane 40 receives an item 50 from the carriage (the item 50 is carried in). The item 50 carried in from the entrance port 21 is temporarily placed on the storage rack 30 by the crane 40. Then, the item 50 is taken out from the storage rack 30 by the crane 40, before the crane 40 delivers the item 50 to the carriage at the exit port 22 (the item 50 is carried out).

The delivery of the item 50 between the crane 40 and the carriage may be performed not directly but indirectly. That is, it may be possible that a delivery table is disposed at the entrance port 21 or the exit port 22, and that the item 50 is delivered via the delivery table. The storage system 1 of this example embodiment includes plural entrance ports 21 and plural exit ports 22. Instead, the number of entrance ports 21 installed may be one, and the number of exit ports 22 installed may be one.

The storage rack 30 stores the item 50. As shown in FIG. 2, the storage rack 30 has deck boards 31 arranged one above another in the vertical direction. On each deck board 31, the item 50 can be placed by using the crane 40. In this manner, the storage rack 30 can store plural items. The storage racks 30 are arranged side by side along the track 10. More specifically, the storage racks 30 are disposed in regions surrounded by the loop tracks 11, 12, 13, respectively, and in regions interposed between each ones of the loop tracks 11, 12, 13. In other words, the storage racks 30 are disposed lateral (left or right) to the crane 40 moving along the track 10 when viewed in its traveling direction.

The crane 40 includes a traveling unit 41, an electricity receiving unit 42, a transfer unit 43, and a guide pillar 44. The plural cranes 40 may have the same configurations.

The traveling unit 41 is disposed within the travel rail 10a. The traveling unit 41 includes a travel motor to generate power for making the crane 40 travel, and a wheel disposed in contact with the traveling support surface of the travel rail 10a. The wheel is driven to rotate by the travel motor. The electricity receiving unit 42 is disposed within the electricity supply rail 10b. The electricity receiving unit 42, which is, for example, a pickup coil to obtain electric power from the electricity supply line of the electricity supply rail 10b, supplies the electric power obtained from the electricity supply line to electrical equipment such as the travel motor.

The transfer unit 43 is movable in the vertical direction along the guide pillar 44. The transfer unit 43 is capable of extending and retracting a member such as a fork to and from the deck boards 31. With this configuration, the transfer unit 43 places the item 50 on the deck board 31 of the storage rack 30, or takes out the item 50 placed on the deck board 31 of the storage rack 30. The storage system 1 also includes a guide rail 18 installed on a floor of the factory. The guide rail 18 has a rail (not shown). Along this rail, the guide pillar 44 is movable.

The storage system 1 is controlled by a storage controller (determining controller) 101. The storage controller 101, which may be a server, a PC, or the like, includes a computer, a storage, and a communication module. The storage controller 101 is configured or programmed to perform controls relating to, for example, an operation of the crane 40 receiving the item 50 at the entrance port 21, an operation of the crane 40 placing the item 50 on the storage rack 30, and an operation of the crane 40 delivering the item 50 at the exit port 22. The storage controller 101 preferably is provided for each of the storage systems 1.

Connected to the storage controller 101 is a communication controller 102. The communication controller 102 includes a communication module configured or programmed to communicate with the crane 40 and the like. The communication controller 102 periodically communicates with the crane 40 (in detail, with a crane controller included in the crane 40), to make sure that the crane 40 is available as well as to acquire the position of the crane 40. If the communication controller 102 cannot receive response from the crane 40, or if the communication controller 102 receives a signal indicating unavailability of the crane 4 from the crane 40 itself, the communication controller 102 acquires recognition that the crane 40 is unavailable. The communication controller 102 transmits to the storage controller 101 information about whether the crane 40 is available. Here, the process performed by the communication controller 102 may be at least partially implemented by the storage controller 101.

Connected to the storage controller 101 is the management controller 103. The management controller 103, which may be a server, a PC, or the like, includes a computer, a storage, and a communication module. The management controller 103 is configured or programmed to totally control systems included in the factory. For example, the management controller 103 decides an item 50 to be supplied to the storage controller 101, and decides an item 50 to be supplied to the processing apparatus.

Next, a process of determining whether or not the storage system 1 is available based on a state of the storage system 1 will be described with reference to FIG. 3 to FIG. 6. The state where the storage system 1 is available means the state where it is possible that the item 50 is carried in from the entrance port 21, the carried-in item 50 is stored in the storage rack 30, and the item 50 is carried out from the exit port 22.

Figure 3:
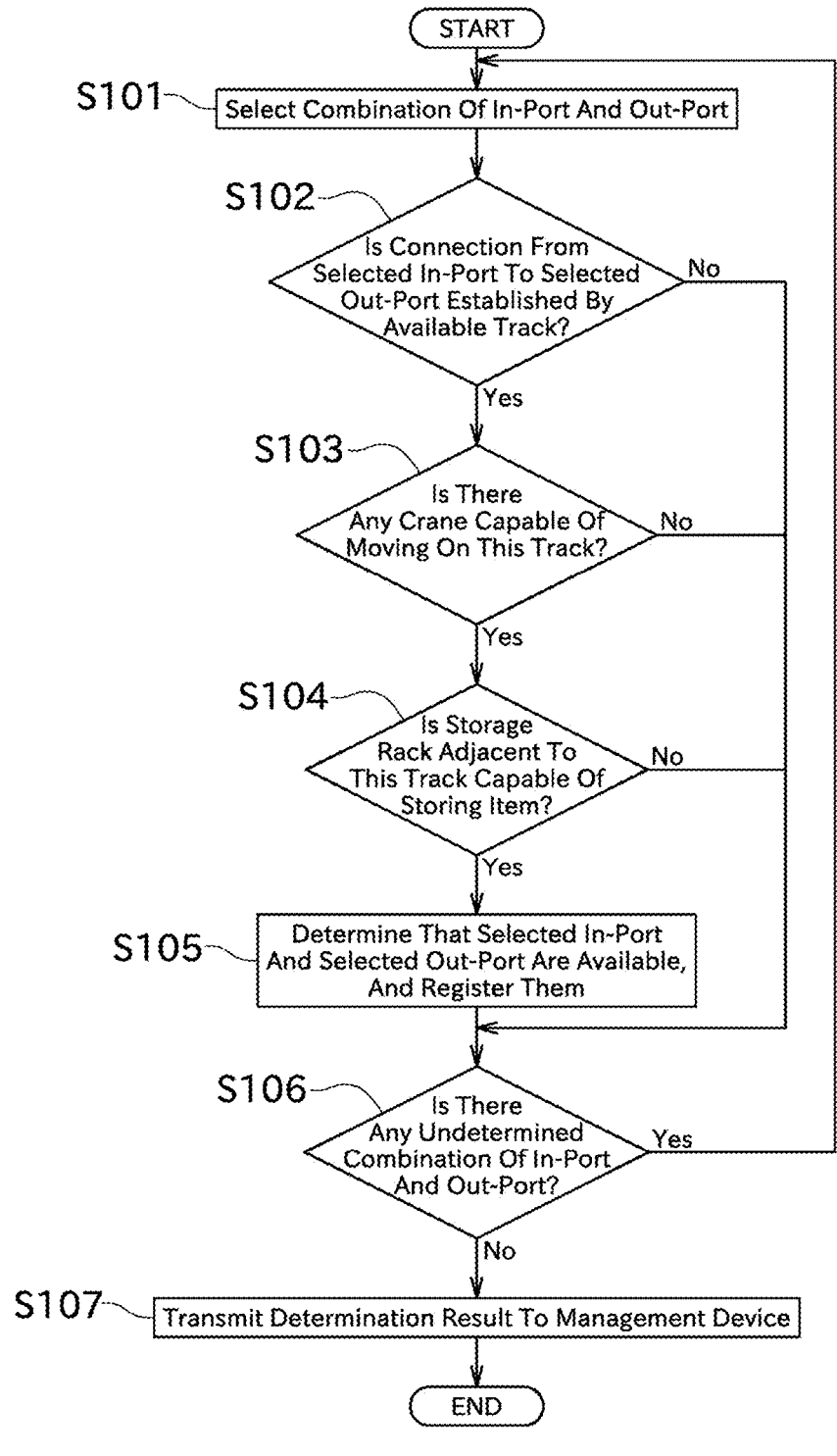
FIG. 3 is a flowchart showing a process of determining whether or not the storage system is available.

FIG. 3 illustrates a flowchart showing the process of determining whether or not the storage system 1 is available based on a state of the storage system 1. In the following, the flowchart of FIG. 3 will be described with reference to a specific example illustrated in FIG. 4.

Figure 4:
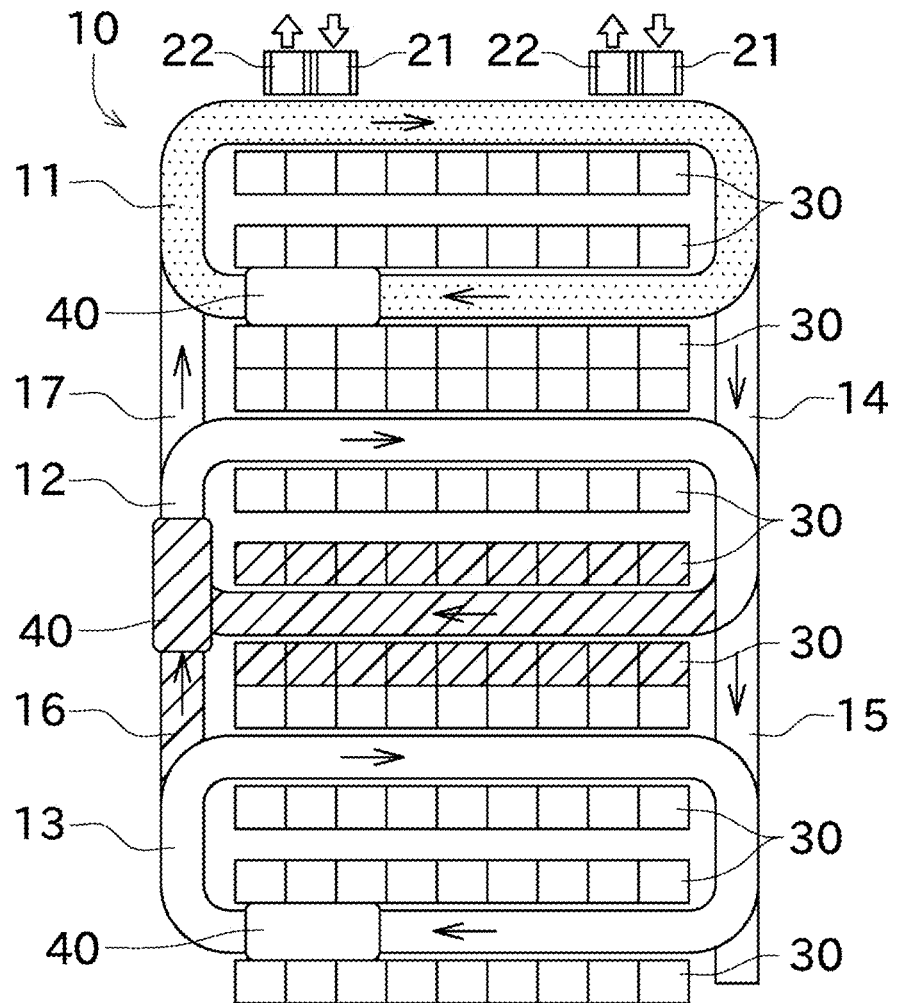
FIG. 4 is a diagram schematically showing a track, storage racks, and a crane that are unavailable in a first example.

Referring to FIG. 4, available portions of the storage system 1 are shown so as to be distinguishable from unavailable portions. FIG. 4 shows an example in which the crane 40 located in the loop track 12 incurs an abnormality so that the crane 40 is stopped. In this case, the crane 40 cannot respond in the periodic communication with the communication controller 102. The storage controller 101, which controls the crane 40 based on the position of the crane 40, can identify a position at which the crane 40 was located immediately before a response from the crane 40 becomes unreached. Thus, an occurrence of the abnormality in the crane 40, and the position of the crane 40 can be identified. Here, it may be possible that if a communication function of the crane 40 is still maintained, the crane 40 transmits to the communication controller 102 the presence of the abnormality in itself and the position of itself. Through communication with the communication controller 102, the storage controller 101 acquires information on whether or not the crane 40 is available.

In the example illustrated in FIG. 4, the loop track 12 and the connecting track 16 where the crane 40 having incurred the abnormality is located are unavailable. In addition, the storage racks 30 adjacent to these portions of the track 10 are unavailable.

In this example embodiment, an available portion of the track 10 is identified based on an abnormality of the crane 40. Instead, an available portion of the track 10 may be identified based on an abnormality of another portion or component. For instance, when the electricity supply rail 10b of the track 10 has an abnormality, the track 10 may be identified as unavailable in a region where the abnormality is present. Alternatively, when the signal line of the track 10 has an abnormality, the track 10 may be identified as unavailable in a region where the abnormality is present.

First, the storage controller 101 selects a combination of one entrance port 21 and one exit port 22 (S101). In a case where there are plural entrance ports 21 and plural exit ports 22, the storage controller 101 makes the following determination for all combinations of the entrance ports 21 and exit ports 22, as will be described later.

The storage controller 101 then determines whether or not connection from the selected entrance port 21 to the selected exit port 22 is established by an available portion of the track 10 (S102; first condition). More specifically, the storage controller 101 executes a path finding based on reference points, namely, the selected entrance port 21 and exit port 22. Then, in the track 10, the storage controller 101 determines whether or not there is any path that passes through only an available portion of the track 10 (any path that does not pass through an unavailable portion of the track 10).

Especially when a one-way path is present as illustrated in this example embodiment, it is preferable to search for both a path having the entrance port 21 as its starting point and the exit port 22 as its ending point and a path having the exit port 22 as its starting point and the entrance port 21 as its ending point. This is because in order that the storage system 1 can work, it is insufficient that the crane 40 from the entrance port 21 reaches the exit port 22 once, but it is necessary that the crane 40 has free access to the entrance port 21 and the exit port 22.

In the example illustrated in FIG. 4, whichever combination of the entrance port 21 and the exit port 22 is selected, the loop track 11 satisfies the first condition.

The storage controller 101 then determines whether or not there is any crane 40 capable of moving on the portion of the track 10 that satisfies the first condition (S103; second condition). The storage controller 101 makes this determination based on the information acquired from the communication controller 102, and a result of the determination about the first condition. If there is any available crane 40 on the portion of the track 10 that satisfies the first condition, the storage controller 101 determines that the second condition is satisfied. Alternatively, if there is a crane 40 capable of moving to the portion of the track 10 that satisfies the first condition although the crane 40 is not present on the portion of the track 10 that satisfies the first condition at a time point when the determination is made, the storage controller 101 determines that the second condition is satisfied.

The storage controller 101 then determines whether or not a storage rack 30 adjacent to the portion of the track 10 that satisfies the first condition is capable of storing an item 50 (S104; third condition). The storage rack 30 being capable of storing an item 50 means that the storage rack 30 is available and the storage rack 30 has an empty deck for the item 50 to be placed thereon. The storage rack 30 being available means that, for example, no error is occurring in the storage rack 30. The storage controller 101 calculates the number of empty decks (i.e., the number of effective decks) of the storage rack 30 adjacent to the portion of the track 10 that satisfies the first condition, and determines whether or not the number of empty decks is not less than one. Being adjacent to the track 10 means being disposed at a position accessible by the crane 40 moving along the track 10.

Instead of the configuration of this example embodiment, it may be determined that the third condition is satisfied if the number of empty decks of the storage rack 30 adjacent to the portion of the track 10 that satisfies the first condition is not less than a threshold.

In the example illustrated in FIG. 4, the storage racks 30 disposed inside the loop track 11 are adjacent to the portion (loop track 11) of the track 10 that satisfies the first condition. Moreover, out of the storage racks 30 disposed between the connecting tracks 14 and 17, the storage racks 30 on the side close to the loop track 11 are also adjacent to the portion (loop track 11) of the track 10 that satisfies the first condition. If these storage racks 30 have any empty deck, the storage controller 101 determines that the storage rack 30 is capable of storing the item 50.

If all of the first, second, and third conditions described above are satisfied, the storage controller 101 determines that the entrance port 21 and the exit port 22 selected in step S101 are available, and registers them (S105). If at least one combination of the entrance port 21 and the exit port 22 is available, the storage controller 101 determines that the storage system 1 is available. This is because the storage system 1 can be operated by using the at least one combination. In this example embodiment, the determinations are made not only on the first and second conditions but also on the third condition, and therefore it is possible to determine not only that the storage system 1 is available but also that a carried-in item 50 is storable.

The storage controller 101 then determines whether or not there is any undetermined combination of the entrance port 21 and the exit port 22 (S106). If there is any undetermined combination of the entrance port 21 and the exit port 22, the storage controller 101 executes the process of step S101 to step S105. Here, if the storage controller 101 determines that any one of the first, second, or third conditions is not satisfied, the storage controller 101 determines whether or not there is any undetermined combination of the entrance port 21 and the exit port 22 (S106), too.

If there is no undetermined combination of the entrance port 21 and the exit port 22, in other words, if all of the combinations of the entrance ports 21 and the exit ports 22 have been determined, the storage controller 101 transmits a result of determinations to the management controller 103 (S107).

The result of determinations that the storage controller 101 transmits to the management controller 103 includes, for example, whether or not the storage system 1 is available, identification information for identifying the entrance port 21 and the exit port 22 determined as available, and the number of effective decks.

Next, results of determinations in examples illustrated in FIG. 5 and FIG. 6 will be described.

Figure 5:
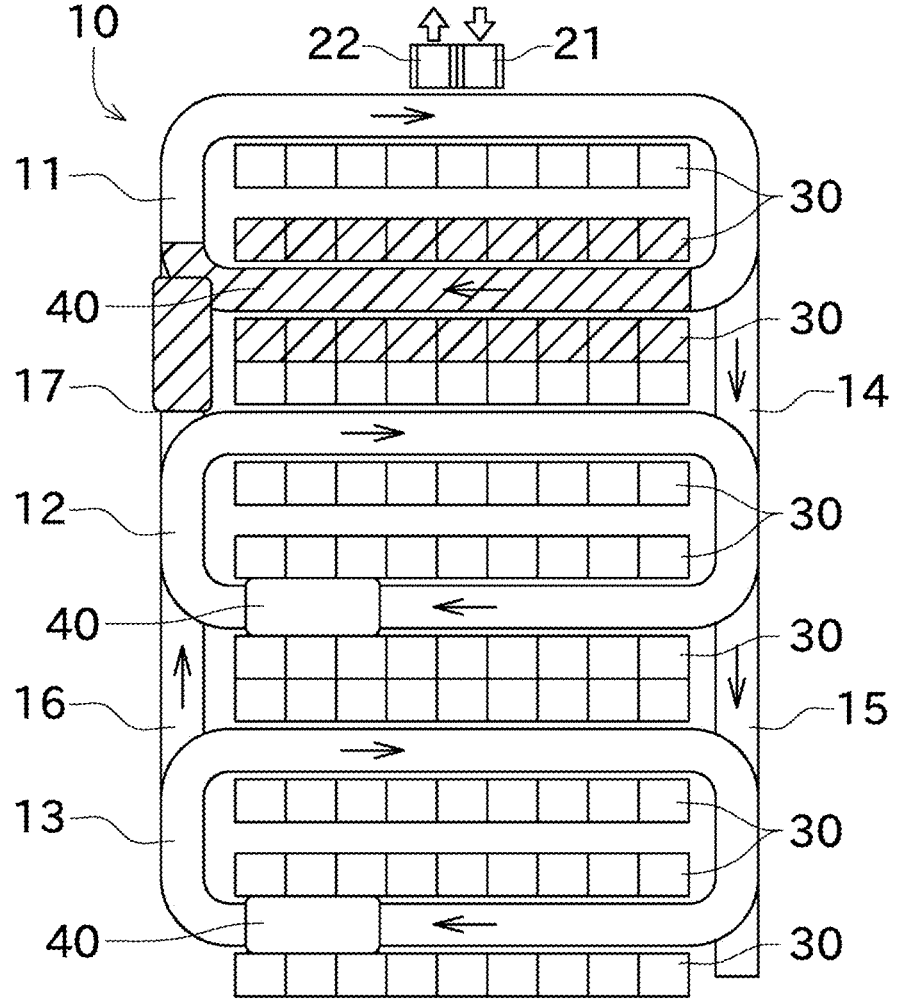
FIG. 5 is a diagram schematically showing a track, storage racks, and a crane that are unavailable in a second example.

FIG. 5 shows an example in which the crane 40 located in the loop track 11 experiences an abnormality so that the crane 40 is stopped. In this case, a portion of the loop track 11 and the connecting track 17 are unavailable. In addition, the storage racks 30 adjacent to these portions of the track 10 are unavailable.

In FIG. 5, the entrance port 21 and the exit port 22 are disposed adjacent to the loop track 11. Since the loop track 11 of this example embodiment is one-way, a path extending from the entrance port 21 to the exit port 22 does not exist. That is, the first condition (S102 in FIG. 3) is not satisfied, and therefore it is determined that the storage system 1 is unavailable.

Figure 6:
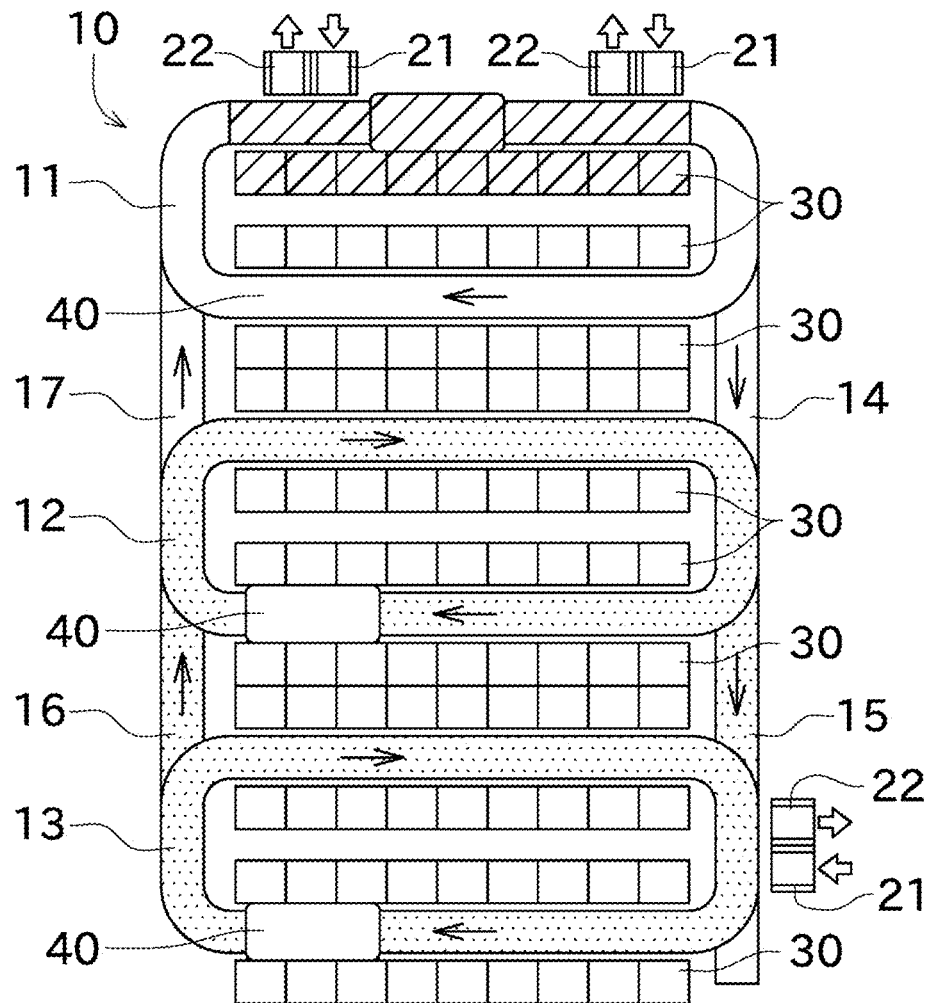
FIG. 6 is a diagram schematically showing a track, storage racks, and a crane that are unavailable in a third example.

FIG. 6 shows an example in which the crane 40 located in the loop track 11 and positioned near the entrance port 21 and the exit port 22 incurs an abnormality so that the crane 40 is stopped. In this case, a portion of the loop track 11 (especially where the entrance port 21 and the exit port 22 are disposed) is unavailable. In the example illustrated in FIG. 6, however, an entrance port 21 and an exit port 22 are additionally disposed adjacent to the loop track 13.

A path whose reference points are the entrance port 21 and the exit port 22 adjacent to the loop track 11 does not exist. Accordingly, regarding these entrance port 21 and exit port 22, it is not determined that there is availability. On the other hand, a path whose reference points are the entrance port 21 and the exit port 22 adjacent to the loop track 13 exists. To be specific, there are a path starting from the entrance port 21, extending through the loop track 13, and returning to the exit port 22, and a path starting from the entrance port 21, extending through the loop track 13, the connecting track 16, the loop track 12, and the connecting track 15, and returning to the exit port 22. Thus, a portion of the track 10 that satisfies the first condition is present as shown in FIG. 6. In addition, available cranes 40 are present in the portion of the track 10 that satisfies the first condition, and therefore if there is an empty deck capable of storing an item 50, it is determined that the storage system 1 is available.

Although the track 10 is one-way in the above-described example embodiment, the track 10 may be configured to allow reciprocating movement. For example, a storage system 1 shown in FIG. 7 includes a track 10 that is set so as to allow reciprocating movement.

Figure 7:
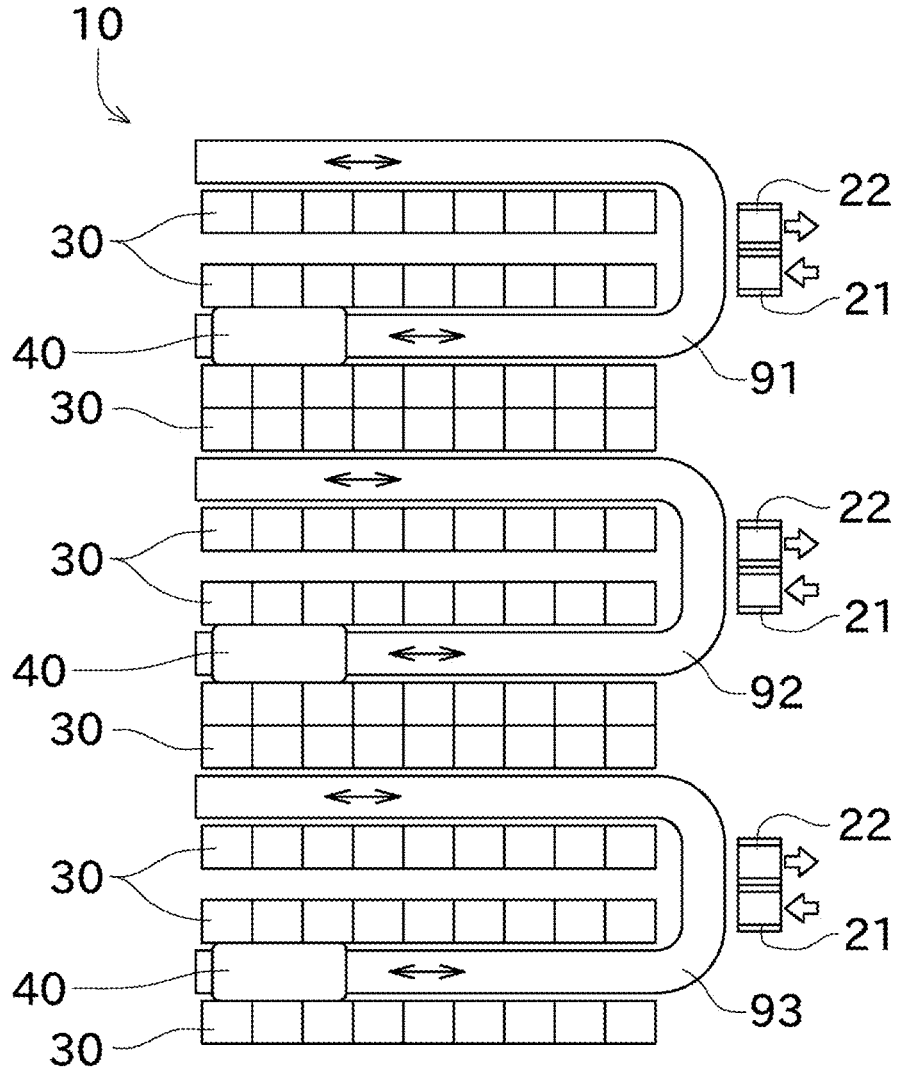
FIG. 7 is a diagram schematically showing tracks according to another example embodiment of the present invention.

The track 10 in FIG. 7 includes U-shaped tracks 91, 92, 93. The U-shaped tracks 91, 92, 93 are independent of one another, and are not connected to one another. The U-shaped tracks 91, 92, 93 each have an entrance port 21 and an exit port 22. Storage racks 30 are disposed adjacent to the U-shaped tracks 91, 92, 93. The U-shaped tracks 91, 92, 93 each have one crane 40. In the track 10 of this type as well, basically, whether or not the storage system 1 is available can be determined by executing the same process as illustrated in the above-described example embodiment. Here, a case will be assumed in which, for example, in FIG. 7, a portion of the track 10 adjacent to the entrance port 21 and the exit port 22 is available while the other portion of the track 10 (i.e., a portion of the track 10 adjacent to the storage racks 30) is unavailable, under the below-described situation. In this case, the entrance port 21 and the exit port 22 are connected by the available portion of the track 10, and therefore the storage controller 101 determines as Yes in step S102. If the crane 40 is present in the portion of the track 10 adjacent to the entrance port 21 and the exit port 22, the storage controller 101 determines as Yes in step S103. In step S104, the storage controller 101 determines whether or not a storage rack 30 adjacent to this portion of the track 10 is capable of storing an item. In the first place, however, no storage rack 30 exists in the portion of the track 10 adjacent to the entrance port 21 and the exit port 22. In this case, the storage controller 101 determines as No in step S104, because when no storage rack 30 exists, there is no capability of storing an item 50.

As thus far described, the storage system 1 according to this example embodiment stores an item 50 carried in from the outside, and carries out an item 50 stored therein to the outside. The storage system 1 includes the entrance port 21, the storage rack 30, the exit port 22, plural cranes 40, and the storage controller 101. The entrance port 21 is a place at which the item 50 is carried in from the outside. The storage rack 30 stores the item 50. The exit port 22 is a place at which the item 50 is carried out to the outside. The crane 40, by moving along the track 10, accesses the entrance port 21, the storage rack 30, or the exit port 22. When the first and second conditions are satisfied, the storage controller 101 determines that the storage system 1 is available, the first condition being that the path extending from the entrance port 21 to the exit port 22 includes an available portion of the track 10, the second condition being that there is the crane 40 capable of transporting the item 50 along the portion of the track 10 that satisfies the first condition.

Accordingly, even when a portion of the storage system 1 is unavailable, it is possible to determine that the storage system 1 is available, if another portion of the storage system 1 is available. The storage system 1 can be operated efficiently, therefore. Especially because the determination is made for the crane 40 as well as for the track 10, whether or not the storage system 1 is available can be determined with a good accuracy.

In the storage system 1 according to this example embodiment, the storage controller 101 determines that the item 50 carried in from the outside is storable, when the third condition in addition to the first and second conditions is satisfied, the third condition being that the storage rack 30 adjacent to the portion of the track 10 that satisfies the first condition is capable of storing the item 50.

Accordingly, it is possible to determine not only whether or not the storage system 1 is available but also whether or not the item can be actually stored in the storage system 1.

In the storage system 1 according to this example embodiment, the entrance port 21 includes plural entrance ports 21, and the exit port 22 includes plural exit ports 22. The storage controller 101 determines whether or not the first condition is satisfied, for all combinations of the entrance ports 21 and the exit ports 22.

Accordingly, occurrence of a situation where the storage system 1 is determined as unavailable though it actually is available can more securely be prevented.

In the storage system 1 according to this example embodiment, the storage controller 101 is capable of communication with the management controller 103 that provides an instruction for the item 50 to be carried into the entrance port 21. The storage controller 101 transmits to the management controller 103 whether or not the storage system 1 is available.

Since the management controller 103 can receive information indicating that the storage system is available, it is possible to make effective use of the storage system.

In the storage system 1 according to this example embodiment, the entrance port 21 includes plural entrance ports 21, and the exit port 22 includes plural exit ports 22. The storage controller 101 transmits to the management controller 103 identification information for identifying the entrance port 21 and the exit port 22 that satisfy the first and second conditions.

Since the management controller 103 can be notified of the entrance port and the exit port that are available, it is possible to make further effective use of a management system.

In the storage system 1 according to this example embodiment, the track 10 includes the plural loop tracks 11, 12, 13 and the connecting tracks 14, 15, 16, 17 that connect the plural loop tracks 11, 12, 13. The entrance port 21 and the exit port 22 are disposed adjacent to the loop tracks 11, 12, 13. The storage racks 30 are disposed in the regions surrounded by the loop tracks 11, 12, 13, respectively, and in the regions interposed between each ones of the loop tracks 11, 12, 13.

Accordingly, whether or not the storage system 1 is available can be determined even though the track 10 is complicated by including the plural loop tracks 11, 12, 13.

In the storage system 1 according to this example embodiment, the storage racks 30 are capable of storing plural items 50 in such a manner that the items are arranged one above another in the vertical direction. The crane 40 is capable of traveling along the track 10 disposed on a ceiling, and, by moving up and down, accesses the items 50 in the storage racks 30.

The effects of example embodiments of the present invention can be exerted more effectively when applied to a storage system including a storage rack capable of storing a number of items.

The present example embodiments may include the following features 1 to 7.

Feature 1

A storage system for storing an item carried in from outside and carrying out the stored item to the outside, the storage system including an entrance port that is a place at which the item is carried in from the outside, a storage rack to store the item, an exit port that is a place at which the item is carried out to the outside, plural transporters movable along a track to access the entrance port, the storage rack, or the exit port, and a determining controller configured or programmed to determine that the storage system is available, when first and second conditions are satisfied, the first condition being that a path extending from the entrance port to the exit port includes an available track, the second condition being that there is the transporter capable of transporting the item along the track that satisfies the first condition.

Feature 2

The storage system according to the feature 1, in which the determining controller is configured or programmed to determine that the item carried in from the outside is storable, when a third condition in addition to the first and second conditions is satisfied, the third condition being that the storage rack disposed adjacent to the track that satisfies the first condition is capable of storing the item.

Feature 3

The storage system according to the feature 1 or 2, in which the entrance port includes plural entrance ports, and the exit port includes plural exit ports, and the determining controller is configured or programmed to determine whether or not the first condition is satisfied, for all combinations of the entrance ports and the exit ports.

Feature 4

The storage system according to any one of the features 1 to 3, in which the determining controller is configured or programmed to communicate with a management controller that provides an instruction for the item to be carried into the entrance port, and the determining controller is configured or programmed to transmit to the management controller whether or not the storage system is available.

Feature 5

The storage system according to the feature 4, in which the entrance port includes plural entrance ports, and the exit port includes plural exit ports; and the determining controller is configured or programmed to transmit to the management controller identification information to identify the entrance port and the exit port that satisfy the first and second conditions.

Feature 6

The storage system according to any one of the features 1 to 5, in which the track includes plural loop tracks and a connecting track that connects the plural loop tracks, the entrance port and the exit port are adjacent to the loop track, and the storage rack is in a region surrounded by the loop track and in a region interposed between the loop tracks.

Feature 7

The storage system according to any one of the features 1 to 6, in which the storage rack is capable of storing a plurality of the items in such a manner that the items are arranged one above another in a vertical direction, and the transporters are capable of traveling along the track on a ceiling and movable up and down to access the items in the storage rack.

While the foregoing has described example embodiments of the present invention, the above-described configurations may be modified, for example, as follows.

The flowchart illustrated in the example embodiments described above is an example, and it may be acceptable to omit a portion of the process, to change a portion of the contents of the process, or to add a new process. For example, the process of step S104 (third condition) may be omitted.

In the example embodiments described above, the storage controller 101 makes the determination about the first condition (the condition related to the track 10), and then makes the determination about the second condition (the condition related to the crane 40). The determination process, however, does not always need to be divided into the first condition and the second condition, provided that what is determined is substantially the same as above. For example, it may be possible that the storage controller 101 selects one of the cranes 40, determines whether or not this crane 40 is able to move from the entrance port 21 to the exit port 22, and executes this determination process for all the cranes 40.

In the example embodiment described above, the storage controller 101 makes the determination about the first condition (the condition related to the track 10), and then makes the determination about the third condition (the condition related to the storage rack 30). The determination process, however, does not always need to be divided into the first condition and the third condition, provided that what is determined is substantially the same as above. For example, it may be possible that the storage controller 101 selects one of the storage racks 30, determines whether or not this storage rack 30 is disposed adjacent to the available track 10, which extends from the entrance port 21 to the exit port 22, and executes this process for all the storage racks 30. Here, the process of the determination about the second condition (the condition related to the crane 40) may follow the determination of whether or not the storage rack 30 is disposed in the available track 10, for example.

Although the crane 40 has been illustrated as an example of the transporter in the foregoing example embodiment, the transporter is not limited to the crane 40, and the present invention is applicable to a transporter (e.g., a ceiling transport vehicle, etc.) having another configuration, as long as the transporter is capable of transporting the item 50.

Although the foregoing example embodiment has described the storage system 1 installed at the factory for manufacturing semiconductor products, the storage system 1 may be installed at a factory for manufacturing other products. The storage system 1 may also be installed at a building (such as a warehouse) other than manufactories.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A storage system for storing an item carried in from outside and carrying out the stored item to the outside, the storage system comprising:
   an entrance port that is a place at which the item is carried in from the outside;
   a storage rack to store the item;
   an exit port that is a place at which the item is carried out to the outside;
   plural transporters movable along a track to access the entrance port, the storage rack, or the exit port; and
   a determining controller configured or programmed to determine that the storage system is available, when first and second conditions are satisfied, the first condition being that a path extending from the entrance port to the exit port includes an available track, the second condition being that there is the transporter capable of transporting the item along the track that satisfies the first condition.

2. The storage system according to claim 1, wherein the determining controller is configured or programmed to determine that the item carried in from the outside is storable, when a third condition in addition to the first and second conditions is satisfied, the third condition being that the storage rack disposed adjacent to the track that satisfies the first condition is capable of storing the item.

3. The storage system according to claim 1, wherein
   the entrance port includes plural entrance ports, and the exit port includes plural exit ports; and
   the determining controller is configured or programmed to determine whether or not the first condition is satisfied, for all combinations of the entrance ports and the exit ports.

4. The storage system according to claim 1, wherein
   the track includes plural loop tracks and a connecting track that connects the plural loop tracks;
   the entrance port and the exit port are adjacent to the loop track; and
   the storage rack is in a region surrounded by the loop track and in a region interposed between the loop tracks.

5. The storage system according to claim 1, wherein the storage rack is capable of storing a plurality of the items in such a manner that the items are arranged one above another in a vertical direction; and the transporters are capable of traveling along the track on a ceiling and movable up and down to access the items in the storage rack.

6. The storage system according to claim 1, wherein the determining controller is configured or programmed to communicate with a management controller that provides an instruction for the item to be carried into the entrance port; and the determining controller is configured or programmed to transmit to the management controller whether or not the storage system is available.

7. The storage system according to claim 6, wherein the entrance port includes plural entrance ports, and the exit port includes plural exit ports; and the determining controller is configured or programmed to transmit to the management controller identification information to identify the entrance port and the exit port that satisfy the first and second conditions.

\* \* \* \* \*